(12) United States Patent
Jonsson et al.

(10) Patent No.: US 11,214,128 B2
(45) Date of Patent: Jan. 4, 2022

(54) AIR NOZZLE DEVICE FOR A VEHICLE

(71) Applicant: Ningbo Geely Automobile Research & Development Co., Ltd., Ningbo (CN)

(72) Inventors: Tony Jonsson, Alingsås (SE); Oskar Adamsson, Angered (SE); Veronica Berviand, Gothenburg (SE); Marcus Hansson, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 336 days.

(21) Appl. No.: 16/551,209

(22) Filed: Aug. 26, 2019

(65) Prior Publication Data
US 2019/0375274 A1 Dec. 12, 2019

Related U.S. Application Data

(63) Continuation of application No. PCT/CN2018/077917, filed on Mar. 2, 2018.

(30) Foreign Application Priority Data

Mar. 16, 2017 (EP) ..................... 17161296

(51) Int. Cl.
*B60H 1/34* (2006.01)
*B60K 11/08* (2006.01)

(52) U.S. Cl.
CPC ............ *B60H 1/3421* (2013.01); *B60H 1/34* (2013.01); *B60K 11/085* (2013.01); *B60H 2001/3471* (2013.01); *B60H 2001/3478* (2013.01)

(58) Field of Classification Search
CPC B60H 1/34; B60H 1/3421; B60H 2001/3471; B60H 2001/3478; B60K 11/085

(Continued)

(56) References Cited

U.S. PATENT DOCUMENTS 5,873,778 A 2/1999 Badenhorst

FOREIGN PATENT DOCUMENTS

| CN | 102416844 A | 4/2012 |
| CN | 202727926 U | 2/2013 |

(Continued)

OTHER PUBLICATIONS

International Search Report and Written Opinion for corresponding international application No. PCT/CN2018/077917, dated May 25, 2018. 7 pages.

(Continued)

*Primary Examiner* — Kenneth J Hansen
*Assistant Examiner* — Dana K Tighe
(74) *Attorney, Agent, or Firm* — Tucker Ellis LLP

(57) ABSTRACT

The present invention relates to an air nozzle device for a vehicle comprising a housing defining an interior volume and having an air inlet at one side, an air discharge opening at a second side and an air flow channel through the housing for transporting a flow of air between the air inlet and the air discharge opening, the device further comprising an air flow regulator mechanism comprising a rod member comprising a rack, at least one flap member comprising a pinion, and an assembly guide mechanism arranged to be moveable between an assembly position and a non-assembly position, wherein the rack and pinion is arranged to, in an assembled state, interact to rotate the at least one flap member about an axis between an open and a closed position to regulate the flow of air in the air flow channel, the assembly guide mechanism is, in the assembly position, arranged to interact with the at least one flap member and the rod member to assemble the rack and pinion, and the assembly guide mechanism is, in the non-assembly position, arranged to obstruct the assembly of the rack and pinion.

15 Claims, 7 Drawing Sheets

(58) Field of Classification Search
USPC .......................................................... 454/155
See application file for complete search history.

(56) References Cited

FOREIGN PATENT DOCUMENTS

| | | |
|---|---|---|
| CN | 203719074 U | 7/2014 |
| CN | 106488854 A | 3/2017 |
| JP | 2014227014 A | 12/2014 |
| KR | 101 684 192 B1 | 12/2016 |
| WO | 2016075111 A1 | 5/2016 |

OTHER PUBLICATIONS

Extended European Search Report from corresponding European Patent Application No. 17161296.3, dated Oct. 2, 2017, 4 pages.

ion for a vehicle. The invention also relates to a vehicle compartment member such as dashboard, door trim, console or the like, comprising an air nozzle device. Moreover, the invention relates to a vehicle comprising a vehicle compartment member having an air nozzle device.

The invention can be arranged in a dashboard, a door trim, a rear seat console or the like. Although the invention will be described in relation to a car, the invention is not restricted to this particular vehicle, but may as well be installed in other type of vehicles such as minivans, recreational vehicles, off-road vehicles, trucks, buses or the like.

BACKGROUND ART

In the field of air valves and ventilation systems, there is an increasing demand for improving the robustness and minimising the error sources when mounting the components, i.e. when assembling the device. Ventilation systems for vehicles are increasingly complex as the demands on the degree of control of such systems increase. Heating, ventilation and air conditioning (HVAC) systems are typically used to control the environment in a vehicle such that desired interior conditions set by the operator are maintained irrespective of the exterior environment. The vehicle air ventilation system is typically connected to one or several air valves, vents, nozzles or the like in order to discharge a flow of air within a vehicle compartment. In many systems, the ventilation system is connected to the air valve via an air duct. Furthermore, the air valve is often installed in a vehicle compartment member such as a dashboard, and thereby defines the interface between the ventilation system and the vehicle compartment.

Depending on the wishes of the passenger in the vehicle, the volume of air flow in the air valve may be adjusted in order adjust the volume of that passes through the air valve.

However, due to an increasing demand for reducing error sources during assembly of the components making up the device and the system, it is often required to keep a balance between the functions provided by the device and the time it takes to assembly it.

Thus, it has been observed that there is a demand for an air nozzle device which is capable of meeting the requirements as to assembly time and the risks of that it is assembled in an unintended way.

SUMMARY OF THE INVENTION

A general object of the present invention is to provide an air nozzle device for a vehicle which reduces the risk of that the air nozzle device is assembled in a wrong way, yet easy to assemble.

This and other objects, which will become apparent in the following, are accomplished by an air nozzle device for vehicle as defined in the accompanying independent claim. Details of some example embodiments and further optional features are recited in the associated dependent claims.

According to a first aspect of the present invention, an air nozzle device for a vehicle comprising a housing defining an interior volume and having an air inlet at one side, an air discharge opening at a second side and an air flow channel through the housing for transporting a flow of air between the air inlet and the air discharge opening, the device further comprising an air flow regulator mechanism comprising a rod member comprising a rack, at least one flap member comprising a pinion, and an assembly guide mechanism arranged to be moveable between an assembly position and a non-assembly position, wherein the rack and pinion is arranged to, in an assembled state, interact to rotate the at least one flap member about an axis between an open and a closed position to regulate the flow of air in the air flow channel, the assembly guide mechanism is, in the assembly position, arranged to interact with the at least one flap member and the rod member to assemble the rack and pinion, and the assembly guide mechanism is, in the non-assembly position, arranged to obstruct the assembly of the rack and pinion.

In this way, it becomes possible to provide an air nozzle device with a configuration, as described above, which allows for an assembly that reduces the risk of an incorrect assembly of air nozzle device. Further, it allows for an assembly that obstructs the assembly of the air nozzle device in an incorrect, un-synced manner. Further, it allows for an assembly that only allows the assembly of the air nozzle device in a correct, synced manner According to an aspect, the assembly guide mechanism comprise a first guide element connected to the rod member and a second and a third guide element connected to the at least one flap member.

According to an aspect, the first and second guide element is arranged to, in the non-assembly position, interact to obstruct the movement of the rod member in relation to the at least one flap member.

According to an aspect, the first and third guide element is arranged to, in the assembly position, interact to align the rack of the rod member and the pinion of the at least one flap member, when the rod member is moved towards the at least one flap member to assemble the rack and pinion.

According to an aspect, the rod member is moveable back and forwards towards the flap member and the rack is directed towards the pinion of the at least one flap member and arranged to, in the assembled state, interact with the pinion, and the first guide member is connected to the rod member in parallel to the rack and extends towards the at least one flap member.

According to an aspect, the pinion is arranged to rotate about the axis of the at least one flap member and arranged to, in the assembled state, interact with the rack, and the second and the third guide member is connected to the at least one flap member in parallel to the pinion and extends in the radial direction of the axis.

According to an aspect, the first guide element extend past the rack towards the at least one flap member.

According to an aspect, the first guide element is a pin.

According to an aspect, the pinion extends past the second guide member in the radial direction of the axis and the third guide member extend past the pinion in the radial direction of the axis.

According to an aspect, the second guide element is a cam. According to an aspect, the cam has an arc shape. According to an aspect, the cam comprises an arc shaped cam surface.

According to an aspect, the third guide element is a pin. According to an aspect, the second guide element is positioned at a circumferential distance from the third guide element.

According to an aspect, a groove is arranged between said second and third guide element to accommodate at least a part of the first guide element in the assembly position. According to an aspect, in the assembly position, the second guide element is arranged to be directed at an angle in view of the rod member, such that the first guide element is moveable passed the second guide element and into contact with the third guide element, that is directed towards the rod member, when the rod member is moved towards the at least one flap member.

According to an aspect, in the non-assembly position, the second guide element is arranged to be directed at an angle in view of the rod member that is smaller than the angle in the assembly position, such that the first guide element make contact with the second guide element when the rod member is moved towards the at least one flap member.

According to an aspect, the air flow regulator mechanism comprises at least a further flap member and the rod member comprise at least a further rack and a first guide element.

According to an aspect, a vehicle compartment member such as dashboard, door trim, console or the like comprises an air nozzle device according to the above. According to an aspect, a vehicle comprises a vehicle compartment member according to the above.

In addition, the invention provides the possibility of installing the air nozzle device either in a circular cross-sectional housing or in a rectangular cross-sectional housing.

To this end, the device provides an air nozzle device which is both compact and robust while allowing for an assembly that will obstruct an unintended assembly.

The features of this design variant may include any feature or function as mentioned above with respect to the first aspect of the invention, i.e. the aspects relating to the air nozzle device as described herein.

The invention also relates to a vehicle compartment member such as dashboard, door trim, console or the like, wherein the vehicle compartment member comprises an air nozzle device according to the aspect and/or any one of the example embodiments as mentioned above with respect to the first aspect of the invention, i.e. the aspects relating to the air nozzle device.

The invention also relates to a vehicle comprising a vehicle compartment member according to any one of the aspects and/or example embodiments as mentioned above with respect to the vehicle compartment and/or the first aspect of the invention, i.e. the aspect relating to the air nozzle device.

Further features of, and advantages with, the present invention will become apparent when studying the appended claims and the following description. The skilled person realize that different features and aspects of the present invention may be combined to create embodiments other than those described in the following, without departing from the scope of the present invention.

BRIEF DESCRIPTION OF THE DRAWINGS

The various example embodiments of the invention, including its particular features and example advantages, will be readily understood from the following illustrative and non-limiting detailed description and the accompanying drawings, in which.

DETAILED DESCRIPTION OF EXAMPLE EMBODIMENTS OF THE INVENTION

Figure 1:
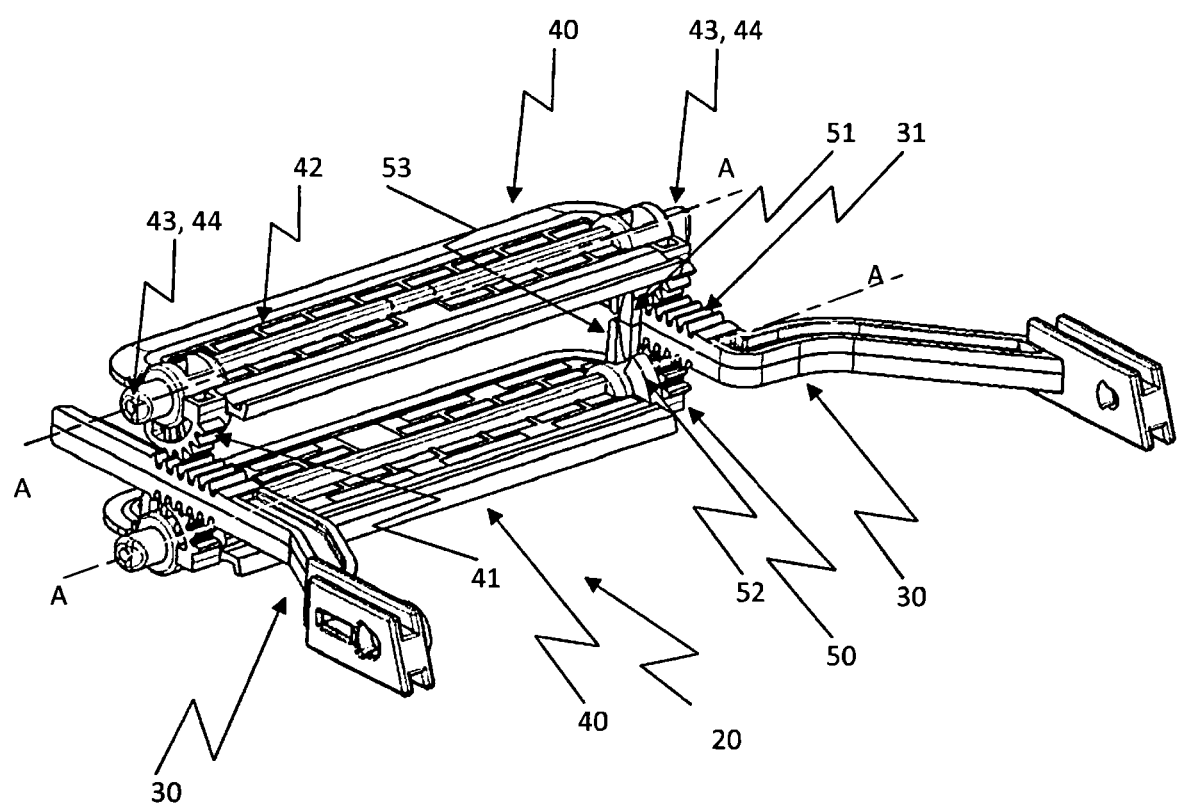
FIG. 1 is a schematic view of an air flow regulator mechanism of an aspect of an air nozzle device for a vehicle according to the present invention, wherein the an air flow regulator mechanism is in an assembled position.

The present invention will now be described more fully hereinafter with reference to the accompanying drawings, in which exemplary embodiments and aspects of the invention are shown. The invention may, however, be embodied in many different forms and should not be construed as limited to the embodiments and aspects set forth herein; rather, these embodiments and aspects are provided for thoroughness and completeness. Like reference characters refer to like elements throughout the description. The drawings are not necessarily to scale and certain features may be exaggerated in order to better illustrate and explain the exemplary embodiments of the present invention.

Figure 2:
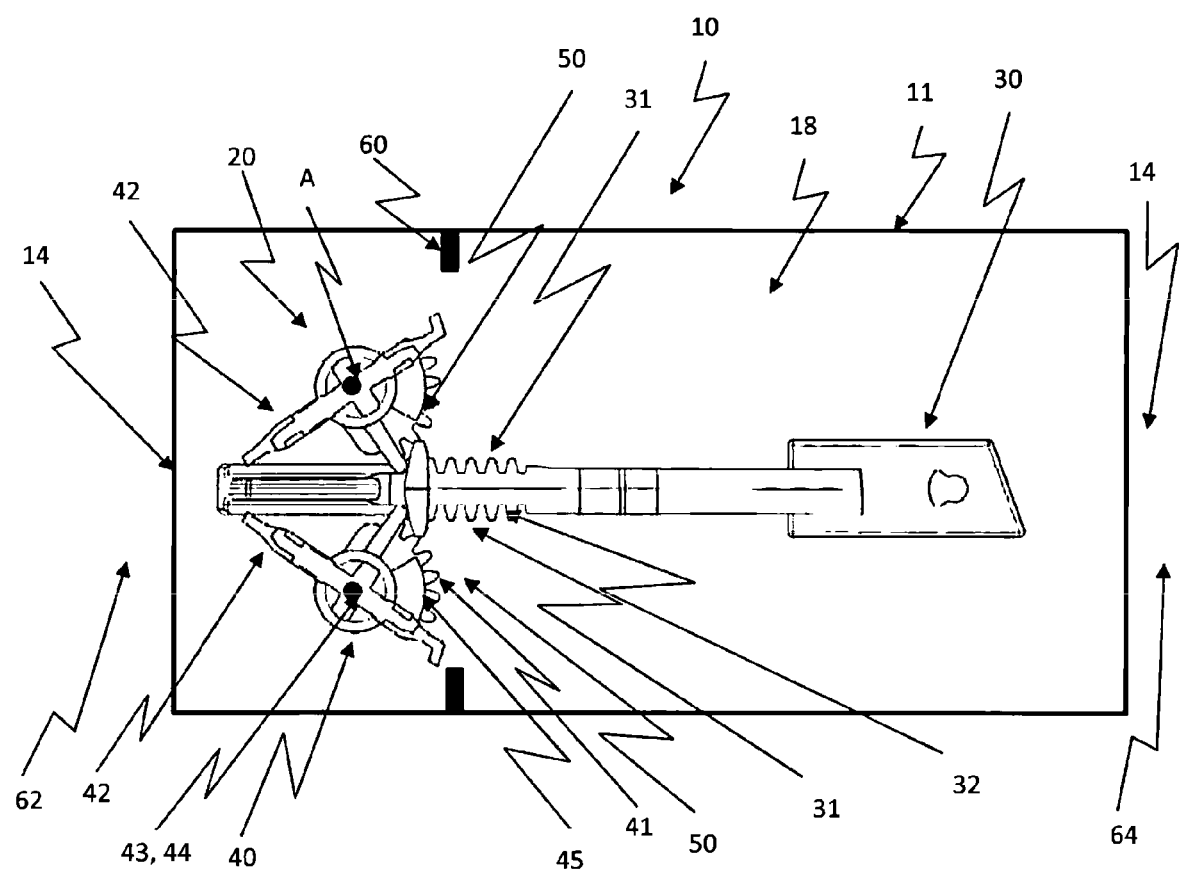
FIG. 2 is a cross-sectional view of an air nozzle device according to an aspect of the invention, wherein the air flow regulating mechanism is in a first assembly position.
Figure 6:
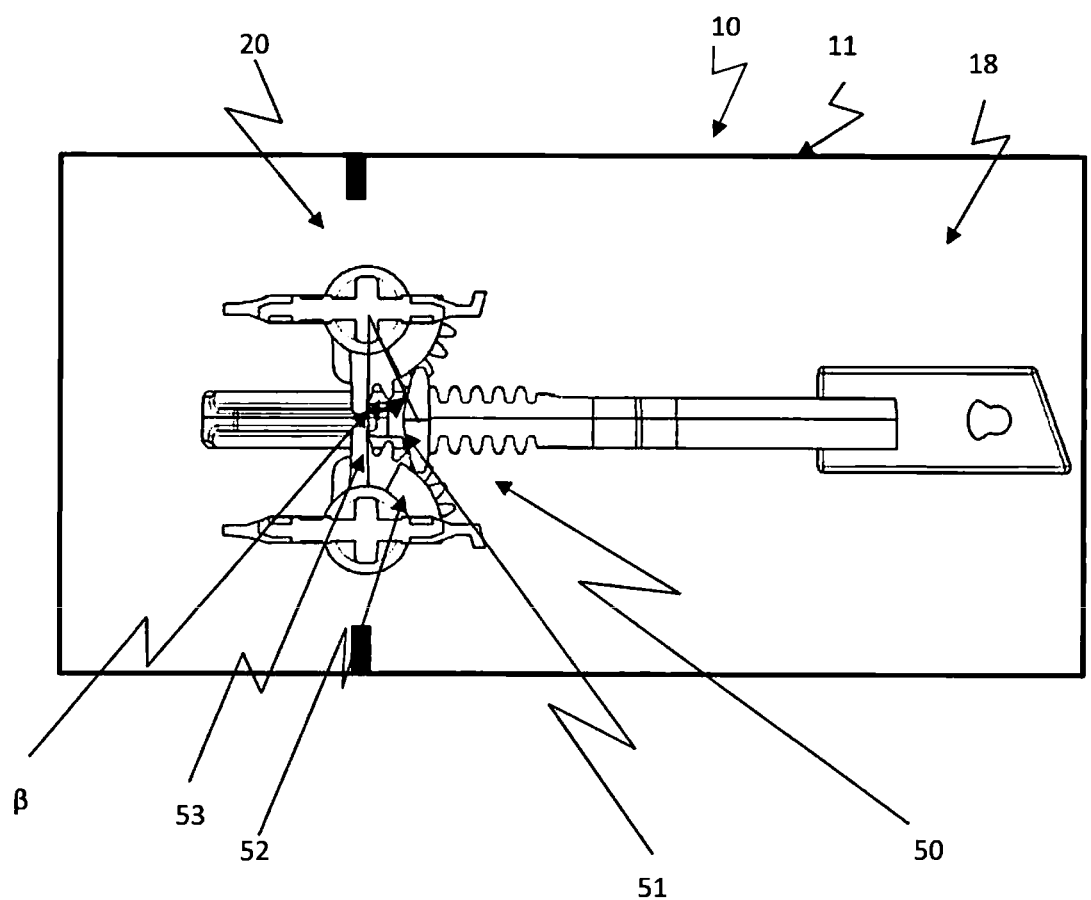
FIG. 6 is a cross-sectional view of an air nozzle device according to an aspect of the invention, wherein the air flow regulating mechanism is in a non-assembly position.
Figure 7:
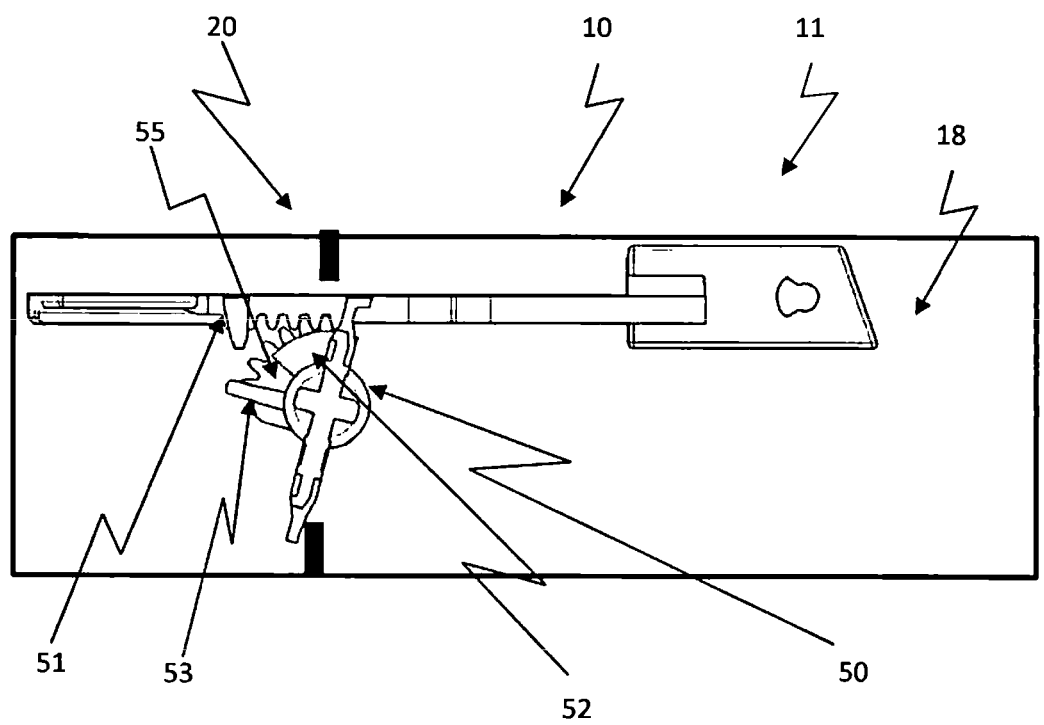
FIG. 7 is a cross-sectional view of an air nozzle device according to an aspect of the invention, wherein the air flow regulating mechanism is in an assembled position with the flap member in a closed position.

Referring now to the figures and FIGS. 1, 2 and 7 in particular, there is depicted a vehicle air nozzle device 10 to be installed in a vehicle compartment member in the form of a dashboard of a vehicle such as a car. Accordingly, the vehicle compartment is provided with an air nozzle device 10 according to an example embodiment, as described hereinafter. The vehicle (not shown) thus includes the vehicle compartment member in the form of a dashboard (not shown) provided with an air nozzle device 10. The air nozzle device 10 is described in further detail below with reference to FIGS. 2-7. The vehicle is provided in the form of a car. Moreover, the instrument panel is arranged in a vehicle compartment of the car. The arrangement, components and functions of the dashboard (instrument panel) are well-known in the art, and are therefore not further described herein. In addition, it should be readily appreciated that an instrument panel (sometimes denoted as a dashboard) is only one example of several different vehicle compartment members, and it is therefore possible that the invention can be installed and arranged in other vehicle compartment members such as in a door trim, rear end of a floor console, B-pillar, tunnel console or the like. In addition, the vehicle compartment member can be arranged and installed in any type of vehicle such as a truck, bus and the like.

Turning now to FIGS. 1-6 and FIG. 7, aspects of an air nozzle device 10 of a vehicle according to the invention is illustrated. The air nozzle device 10 comprises a housing 11, an air flow regulator mechanism 20 and an assembly guide mechanism 50.

According to an aspect, as disclosed in FIG. 1-7, the air nozzle device 10 comprises a housing 11 defining an interior volume. The interior volume may have an inner surface extending in the direction X, Y and Z. Thus the housing 11 here is defined by an inner surface. The inner surface is typically encircling at least a part of an air flow channel 18 extending through the housing 11. The housing 11 in this example embodiment has an extension in the longitudinal (horizontal) direction X, an extension in the transverse direction Y and an extension in the vertical direction Z, see for instance FIGS. 6 and 7. The air nozzle device 10 is typically installed in a horizontal orientation in the vehicle. It should be readily appreciated that the directions are only provided for ease of understanding, and refers to the directions of the device and the housing when the air nozzle device 10 is installed in an essentially plane configuration in the vehicle. In other words, the directions may not be essentially horizontal and vertical in a configuration when the device (and the housing) is installed in an angled position. Alternatively, the air nozzle device 10 can be installed in an essentially vertical orientation in the vehicle. As such, the directions should be construed to refer to the directions of the air nozzle device 10 and the air flow when the device is in an essentially plane installation in a vehicle. The shape of the housing 11 is in this aspect a three-dimensional shape having a rectangular cross-section. However, other shapes are conceivable such as a three-dimensional shape having a circular cross-section, i.e. a cylinder. It is even possible that the shape of the housing is provided in the form of a bowl.

In all aspects as shown in the FIG. 2-7 herein, the housing 11 has an air inlet 12 at one side 64, an air discharge opening 14 at a second side 62 and an air flow channel 18 through the housing 11 for transporting a flow of air between the air inlet 12 and the air discharge opening 14. The air inlet 12 is typically connected to an air duct (not shown), which is connected to e.g. an air ventilation system, air conditioning system, air heating system or the like. Thus, the air nozzle device 10 can be considered as the interface between the air ventilation system (or the air conditioning system or the air heating system) and the vehicle compartment. Accordingly, the air inlet 12 is arranged upstream of the air discharge opening 14, as seen in a longitudinal direction X. In other words, the air discharge opening is arranged downstream of the air inlet 12, as seen in a longitudinal direction X.

The air inlet 12 is configured for receipt of air from an air duct (not shown). The air discharge opening 14 is configured for discharging air into the vehicle compartment. The air flow channel 18 is configured for transporting the flow or air through the housing 11.

As will be readily appreciated from the description herein, the air nozzle device 10 is configured for regulating a flow of air within the vehicle compartment.

Moreover, the air flow regulating mechanism 20 comprise at least one rod member 30 and at least one flap member 40.

According to an aspect, the rod member 30 comprises a rack 31 and the flap member 40 comprises a pinion 41. The rack 31 and pinion 41 is arranged to, in an assembled state, interact to rotate the at least one flap member 40 about an axis A between an open and a closed position to regulate the flow of air in the air flow channel 18. The flap member 40 is configured to be adjusted between a plurality of positions by being rotationally arranged about a transverse axis A. In this way, the air flow regulating mechanism 30 is adjusted between a plurality of positions, as seen in the transverse direction Y. Typically; the air flow regulating mechanism 20 is at least moveable between an open position, as disclosed in FIG. 3, and a closed position, as disclosed in FIG. 5, as seen in the transverse direction Y. In the open position the flow of air through air nozzle device 10 is high and in the closed position the flap member 40 obstructs the flow of air to reduce the flow of air through the air nozzle device 10.

According to an aspect, the flap member 40 typically, although not strictly necessary, comprises a blade 42 and an axle 43. The blade 42 being moveable between the open position in which the blade 42 forms a passage for the air flow in the air flow channel 18 and the closed position in which the set of blades 42 are adapted to form an essentially air tight configuration against the inner surfaces of the housing 11. The blade 42 is connected to the axle 43 and the blade 42 and axle 43 is rotatable about the axis A. The axle 43 comprises a first and second end 44 that is rotatable mounted to opposite inner surfaces of the housing 11. The pinion 41 is connected to the axle 43 and gears 45 of the pinion 41 extends in the radial direction of the axle 43 and thus also in the radial direction of the axis A. The pinion 41 has the shape of a circular segment or an arc with a central angle of 90°. However, the central angle of the pinion 41 is not restricted to 90° and could be altered in many ways to different aspect. According to an aspect the central angle of the pinion could be between 360°-10°. The arc length of the pinion 41 corresponds to the length of the rack 31. The length of the rack 31 and the arc length 45 of the pinion 41 are adapted to the length that the rod member 30 is moveable back and forward in relation to the housing 11 and the movability of air regulating mechanism 20 in the air nozzle device 10. The flap member 40 is mounted perpendicular to the intended flow of air through the air nozzle device 10.

According to an aspect, the rack 31 and the pinion 41 is arranged to interact. Gears 32 of the rack 31 interconnect with the gears 45 of the pinion 41. When the rod member 30 is moved in a direction, marked as B in FIG. 4, towards the air discharge member 14 the rack 31 and pinion 41 interacts and the rack 31 rotates the pinion 41. As the pinion 41 is rotated, the flap member 40 is rotated. The air flow regulating mechanism 20 regulates the air flow in the air nozzle device 10 by moving the rod member 30, and thus also, via the rack 31 and pinion 41, the flap member 40 between the open and closed position.

According to an aspect, the rod member 30 is moveably connected to the inner surface of the housing 11. The rod member 30 is moveable back and forwards towards the air discharge opening 14. The rod member 40 is mounted parallel to the intended flow of air through the air nozzle device 10.

According to an aspect the air flow regulating mechanism 20 is configured to move between an open position defining a passage for the air flow in the air flow channel and a closed position defining an essentially air tight configuration. In the closed position the blade 42 of the flap member 40 interacts with a stop member 60 on the inner surfaces of the housing 11, as shown in the FIGS. 2-7. However, it should be readily appreciated that air flow regulating mechanism 20 can be varied and moved to a position between the open position and the closed position. Thus, the air regulating mechanism 20 can be moved and maintained in a position between the open position and the closed position. As an example, the air regulating mechanism 20 can be moved so that the air flow passage is essentially 50% open etc.

According to an aspect, as disclosed in FIGS. 1-6, the air flow regulating mechanism 20 comprise two rod members 30 and two flap members 40. Each rod member 30 comprises two racks 31. The rod member 30 comprises a first and a second rack 31. The flap members 40 each comprise a pinion 41 in accordance with the above.

In an assembled state, as described above, the air regulating mechanism 20 is a secure and robust way of regulating the flow of air in the air nozzle device 10. However, if the rod member 30 is positioned incorrect in view to the flap member 40, the flap member 40 can be un-synced in view of any further flap members 40 and/or the rod members 30. In some cases this would lead to an air regulating device 20 that is unable to regulate the flow of air between the end positions of the open position and closed position. Even worse, if the gears 45 of the pinion 41 is un-synced with the gears 32 of the rack 31 this could lead to a breakdown of the air regulating mechanism 20 or that the rod member 30 and flap member 40 is jammed and not moveable. By being un-synced according to the above is meant that the gears 31 of the rack 31 are positioned to interact with the wrong gears 45 of the pinion 41.

It is thus important that the rod element 30 is correct assembled with the flap members 40 during assembly of the air regulating mechanism 20 of the air nozzle device 10. The assembly guide mechanism 50 is arranged to be moveable between an assembly position and a non-assembly position. The assembly position is a position in which the rod member 30 is positioned in relation to the flap member 40 such that the gears 32 of the rack 31 engage with the intended gears 45 of the pinion 41. Put in another way, the assembly position is the position in which the rod member 30 and the flap member 40 can be assembled in an intended and correct manner Put in yet another way, in the assembly position the rod member 30 and the flap member 40 can be moved in relation to each other without the assembly guide mechanism 50 obstructing the path in which they should be moved to be assembled. The non-assembly position is a position in which the rod member 30 is positioned in relation to the flap member 40 such that the gears 32 of the rack 31 risks engaging with the wrong gears 45 of the pinion 41 and thereby being un-synced. Put in another way, the non-assembly position is the position in which the rod member 30 and the flap member 40 would be assembled in an unintended and incorrect manner.

According to an aspect, the assembly guide mechanism 50 is arranged to interact with the at least one flap member 40 and the rod member 30 to assemble the rack 31 and pinion 41 when it is in the assembly position. The assembly guide mechanism 50 is arranged to obstruct the assembly of the rack 31 and pinion 41 when it is in the non-assembly position.

According to an aspect, as disclosed in FIG. 7, the assembly guide mechanism 50 comprises a first, a second and a third guide element 51, 52, 53. The first guide element 51 is connected to the rod member 30. The second guide element 52 is connected to the at least one flap member 40. The third guide element 53 is connected to the at least one flap member 40.

According to an aspect, as disclosed in FIG. 1-6, the assembly guide mechanism 50 comprises two first, two second and two third guide elements 51, 52, 53. The two first guide elements 51 are connected to the rod member 30. One second guide element 52 is connected to one flap member 40 and the other second guide element 52 is connected to the other flap member 40. One third guide element 53 is connected to one flap member 40 and the other third guide element 53 is connected to the other flap member 40.

Hereafter aspects of the invention will be described with reference to FIG. 1-7. The functionality of the assembly guide mechanism 50 as such is not dependent on the number of flap members 40 and rod members 30 that the air nozzle device 10 comprise. Hereafter, aspects in view of one flap member 40 and one rod member 30 will be described, that also will be the same and apply to air nozzle devices 10 comprising two, three or several flap members 40 and/or rod members 30.

According to an aspect, the first guide element 51 has a pin shape. The first guide element 51 is connected to the rod member 30 in a position that is parallel to the rack 41. Put in another way, the first guide element 51 is connected to the side of the rack 31. The first guide element 51 extends in the same direction as the gears 32 of the rack 31 that it is connected to. The length of the first guide element 51 is longer than the gears 32 of the rack 31 of the rod element 30. Put in another way, the first guide element 51 extends passed the rack 31 towards the pinion 41. The first guide element 51 is thus connected to the rod member 30 and will move together with the rod member 30 when it is moved. When the rod member 30 is moved back and forward towards the air discharge opening 14, the first guide element 51 is moved back and forward towards the flap member 40 and the second and third guide element 52, 53. The width of the first guide element 51 is smaller than the width of the rack 31, i.e. in the X direction of FIG. 2-6. The first guide element 51 is connected to the rack 31 such that it is parallel with the gears of the rack that is closest to the air discharge member 14.

According to an aspect, the second guide element 53 has a circular segment shape. According to an aspect, the second guide element 52 has an arc shape. The second guide element 52 is connected to the flap member 40 in a position that is parallel to the pinion 31. Put in another way, the second guide element 52 is connected to the side of the pinion 41. The second guide element 51 extends in the same direction as the gears of the pinion that it is connected to. The second guide element is connected to the flap member such that the radius of the arc shape and/or circular segment shape correlates with the radius of the axle and thus also the axis A of the flap member. The second guide element 52 is thus connected to the flap member 40 and will move together with the flap member 30 when it is moved. When the flap member 40 is rotated about the axis A, the second guide member 52 will also rotate about the axis A. The length of the second guide element 52 is shorter than length of the pinion 40. The gears of the pinion 41 extend further from the axis A than the pinion 41. The central angle of the second guide element 52 is smaller than the central angle of the pinion 41. Put in another way, the arc length of the second guide element 52 is smaller than the arc length of the pinion 41. The size of the second guide element 52 is thus smaller than the pinion 41. The second guide element 52 is connected to the pinion 41 in parallel with the gears 45 of the pinion 41 that is intended to interact with the gears 32 of the rack 31 that is positioned furthest from the air discharge opening 14.

According to an aspect as disclosed in FIG. 1-7, the third guide element 53 has a pin shape. The third guide element 53 is connected to the flap member 40 in a position that is parallel to the pinion 41. Put in another way, the third guide element 53 is connected to the side of the pinion 41. The third guide element 54 extends in the same direction as the gears 45 of the pinion 41 that it is connected to. The length of the third guide element 51 is longer than the gears 45 of the pinion 41 of the flap element 40. Put in another way, the third guide element 53 is connected to the side of the pinion 41. The third guide element 53 extends in the same direction as the gears 45 of the pinion 41 that it is connected to. The third guide element 53 is connected to the flap member 41 such that the extension of the third guide element 53 correlates with the radius of the axle 44 and thus also the axis A of the flap member 40. The third guide element 53 is thus connected to the flap member 40 and will move together with the flap member 30 when it is moved. When the flap member 40 is rotated about the axis A, the third guide member 53 will also rotate about the axis A. The length of the third guide element 53 is longer than the pinion 40. The third guide element 53 extends further from the axis A than the gears 45 of the pinion 41. The width of the third guide element 53 is smaller than the arc length of the pinion 41. The third guide element 53 is connected to the pinion 41 in parallel with the gears 45 of the pinion 41 that is intended to interact with the gears 32 of the rack 31 that is positioned closest to the air discharge opening 14. The sum of the width of the third guide element 53 and the arc length of the second guide element 52 is smaller than the arc length of the pinion 41.

According to an aspect, the second guide element 52 is connected to the pinion 41 in parallel with the gears 45 of the pinion 41 that is intended to interact with the gears 32 of the rack 31 that is positioned furthest from the air discharge opening 14 and the third guide element 53 is connected to the pinion 41 in parallel with the gears of the pinion 41 that is intended to interact with the gears 32 of the rack 31 that is positioned closest to the air discharge opening 14 and the second guide element 52 is positioned at a distance from the third guide element 53. Put in another way, the second guide element 52 is positioned at a circumferential distance A from the third guide element 53. The distance between the second and third guide element 52, 53 define a groove 55 arranged between said second and third guide element 52, 53.

According to an aspect, as disclosed in FIG. 7, the air flow regulating mechanism 20 comprise one rod members 30 and one flap member 40. The rod member 30 comprises one rack 31. The flap member 40 comprises a pinion 41 in accordance with above.

Hereafter, the method of assembly of the air nozzle device 10 will be described in relation to FIG. 2-6. The assembly guide mechanism 50 is arranged to be moveable between the assembly position and the non-assembly position. In the assembly position the assembly guide mechanism is arranged to interact with the at least one flap member 40 and the rod member 30 to assemble the rack 31 and pinion 41 of the air nozzle device 10. In the non-assembly position the assembly guide mechanism is arranged to obstruct the assembly of the rack 31 and pinion 41 of the air nozzle device 10.

The at least one flap member 40 is rotatable mounted to the inner side of the housing 11. As the flap member 40 is rotatable mounted it could be rotated about the axis A. To assembly the rod member 30 to the flap member 40, the flap member 40 is rotated to an assembly position as disclosed in FIG. 1. Thereafter, the rod member 30 is inserted into the housing and moved towards the flap member, i.e. in the X direction of the air nozzle device 10. In the assembly position the second guide element 52 is rotated such that it is directed away from the rod member 30. As the rod member 30 and the thereon connected first guide element 51 is moved further towards the flap member 30, the first guide element 51 is moved passed the second guide element 52 and into contact with the third guide element 53. The gear 32 of the rack 31 is moved passed the second guide element 52. The first guide element 51 is now located between the second and third guide element 52, 53. The first guide element 51 is thus located in the groove 55 between the second and third guide element 52, 53.

Figure 3:
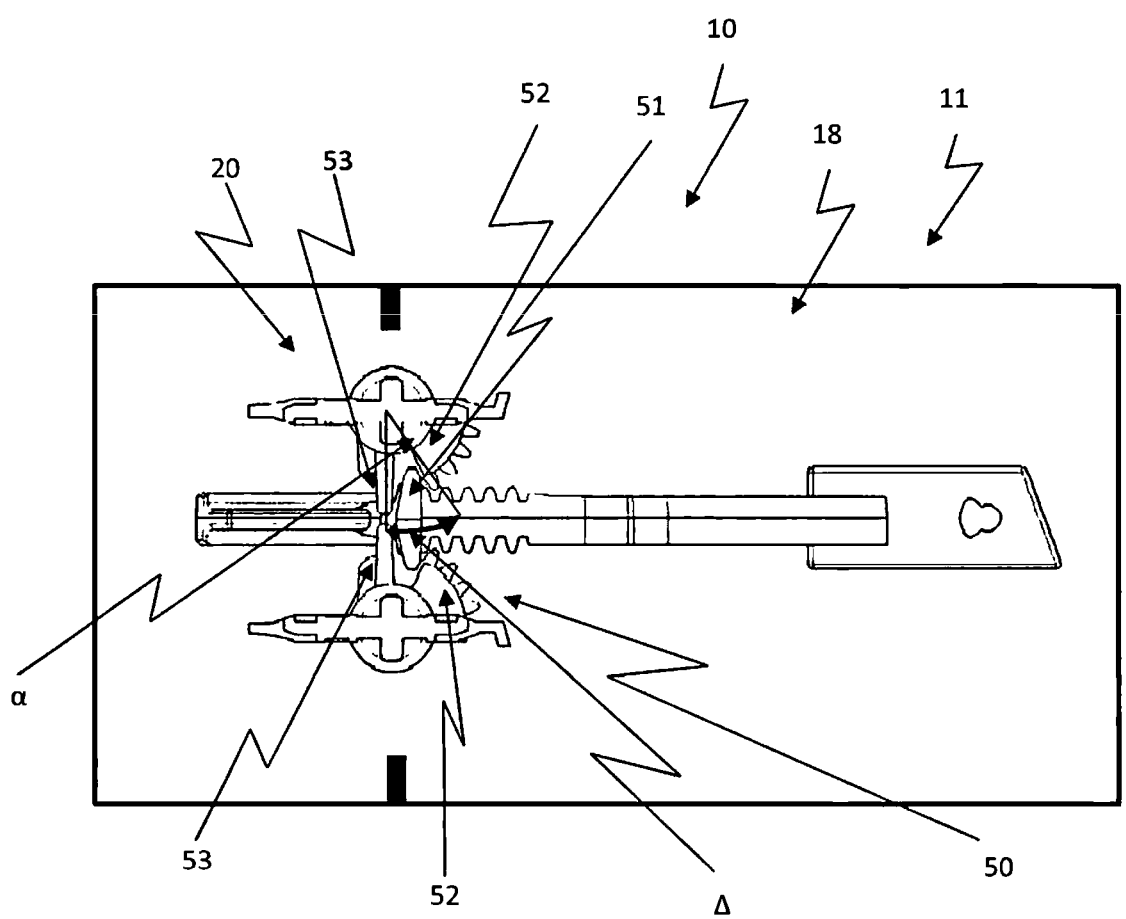
FIG. 3 is a cross-sectional view of an air nozzle device according to an aspect of the invention, wherein the air flow regulating mechanism is in a second assembly position.
Figure 4:
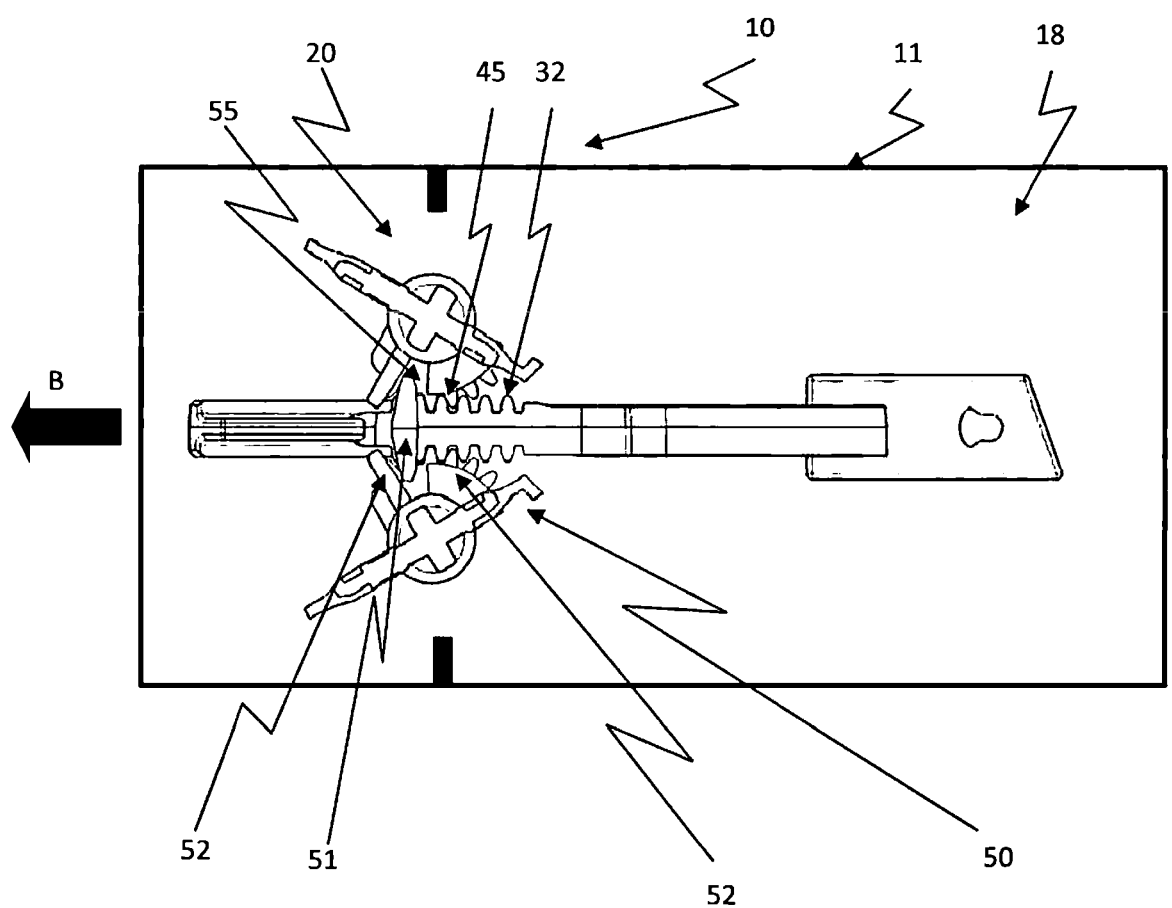
FIG. 4 is a cross-sectional view of an air nozzle device according to an aspect of the invention, wherein the air flow regulating mechanism is in an assembled position with the flap member in an open position.
Figure 5:
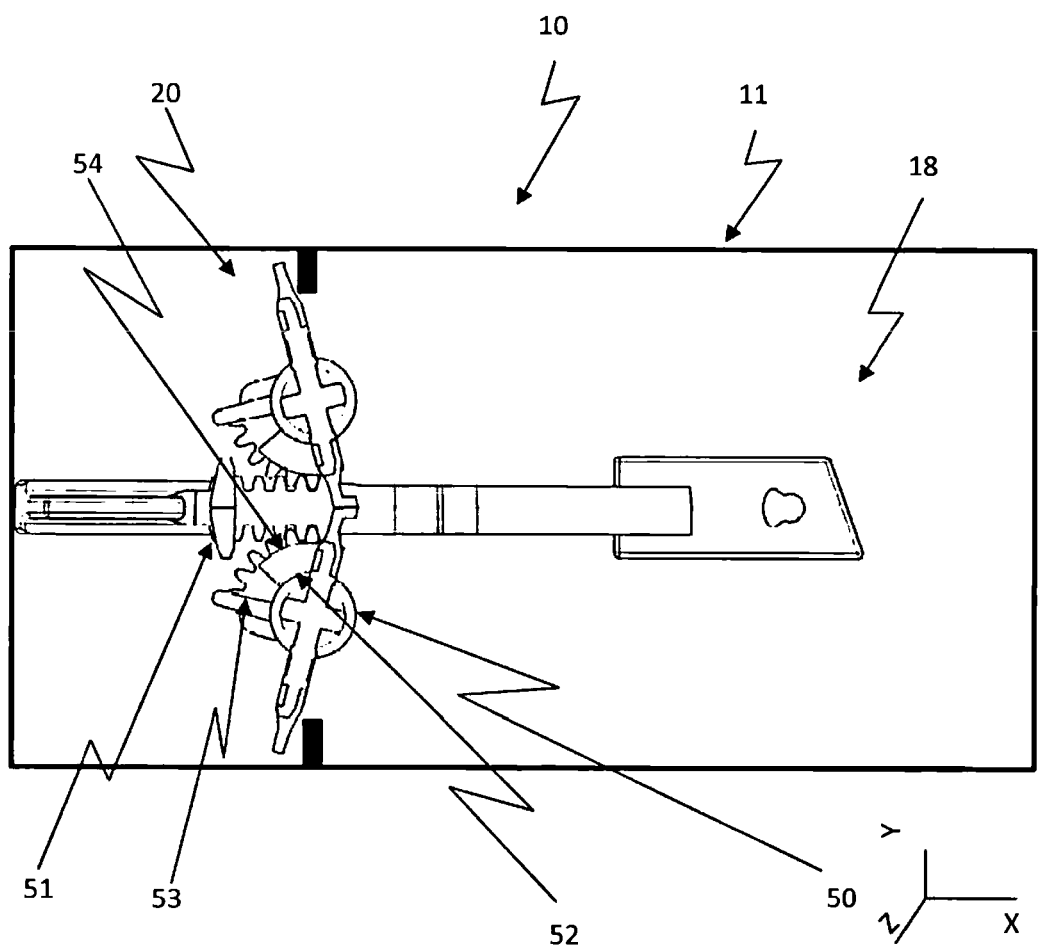
FIG. 5 is a cross-sectional view of an air nozzle device according to an aspect of the invention, wherein the air flow regulating mechanism is in an assembled position with the flap member in a closed position.

Thereafter, as disclosed in FIG. 3, the rod element 30 is moved further towards the air discharge opening 14. The first and second guide elements 51, 52 come into contact.

The gear 32 of the rack 31 that is located closest to the air discharge opening 14 will make contact with the gears 45 of the pinion 41. The interaction between the first and second guide element 51, 52 will sync that the gear 32 of the rack 31 engages with the correct and intended gears 45 of the pinion 41. As the rod member 30 is moved further the first and second guide elements 51, 52 and thus also the rack 31 and pinion 41 will interact to rotate the flap member 40. The air regulating mechanism 20 is now in an assembled position and the rod element 30, is thereafter moveably connected to the inner side of the housing 11. The air regulating mechanism 20 is now in its open position.

As the rod element 30 is moved further towards the air discharge opening 14, the flap member 40 will rotate. When the flap member 40 is rotated it can be in an intermediate position, as disclosed in FIG. 4. Thereafter, if the rod member 30 is moved even further it will eventually reach the closed position, as disclosed in FIGS. 5 and 7, in which the blade 42 of the flap member 40 makes contact with the stop member 60.

If however the flap member 40 is not positioned in an assembly position, i.e. in a non-assembly position as disclosed in FIG. 6, the assembly guide mechanism 50 will obstruct the assembly of the air nozzle device 10. In a non-assembly position the pinion 41 of the flap member 40 is in an un-synced position in relation to the rack 31 of the rod member 30. When the air nozzle device should be assembled the flap member 40 is rotatable mounted in accordance with the above. Thereafter the rod member 30 is moved towards the flap member 40 in a direction toward the air discharge opening 14. However, in this non assembly position the second guide element 52 of the assembly guide mechanism 50 is positioned such that it will make contact with the first guide element 51 when it is moved together with the rod member 30. The second guide element 52 thus will interact with the first guide element 51 to obstruct any further movement of the rod member 40 towards the air discharge opening 14.

In this position a person that is assembling the air nozzle device 10 gets a feedback of that something is wrong since the rod member 30 is obstructed from being moved further.

To remove the obstruction the flap member 40 could be rotated into the assembly position, such that the second guide element 52 will be rotated away from the rod member 30. As the flap member 40 has been moved into the assembly position, the rod member 30 can be moved further towards the air discharge opening 14 and the air regulating mechanism 20 could be assembled in accordance with the steps described above.

According to an aspect, the first and second guide element 51, 52 is arranged to, in the non-assembly position, interact to obstruct the movement of the rod member 30 in relation to the at least one flap member 40.

According to an aspect, the first and third guide element 51, 53 is arranged to, in the assembly position, interact to align the rack 31 of the rod member 30 and the pinion 41 of the at least one flap member 41, when the rod member 30 is moved towards the at least one flap member 40 to assemble the rack 31 and pinion 41.

According to an aspect, the rod member 30 is moveable back and forwards towards the flap member 40 and the rack 31 is directed towards the pinion 41 of the at least one flap member 40 and arranged to, in the assembled state, interact with the pinion 41, and the first guide member 51 is connected to the rod member 30 in parallel to the rack 31 and extends towards the at least one flap member 40.

According to an aspect, the pinion 41 is arranged to rotate about the axis A of the at least one flap member 40 and arranged to, in the assembled state, interact with the rack 31, and the second and the third guide member 52, 53 is connected to the at least one flap member 40 in parallel to the pinion 41 and extends in the radial direction of the axis A.

According to an aspect, the first guide element 51 extend past the rack 31 towards the at least one flap member 41.

According to an aspect, the first guide element 51 is a pin 51. According to an aspect, the pinion 41 extend past the second guide member 52 in the radial direction of the axis A and the third guide member 53 extend past the pinion 41 in the radial direction of the axis A.

According to an aspect, the second guide element 52 is a cam 52.

According to an aspect, the cam 52 has an arc shape. According to an aspect, the cam 52 comprises an arc shaped cam surface 54.

According to an aspect, the third guide element 53 is a pin 53.

According to an aspect, in the assembly position, the second guide element 52 is arranged to be directed at an angle α in view of the rod member 30, such that the first guide element 51 is moveable passed the second guide element 52 and into contact with the third guide element 53, that is directed towards the rod member 30, when the rod member 30 is moved towards the at least one flap member 40.

According to an aspect the second guide element 52 is arranged to be directed at an angle β in the non-assembly position in view of the rod member 30 that is smaller than the angle α in the assembly position, such that the first guide element 51 make contact with the second guide element 52 when the rod member 30 is moved towards the at least one flap member 40.

According to an aspect the air flow regulator mechanism 20 comprise at least a further flap member 40 and the rod member 30 comprise at least a further rack 41 and a first guide element 51.

According to an aspect a vehicle compartment member such as dashboard, door trim, console or the like, comprises a device according to the above. According to an aspect a vehicle comprise a vehicle compartment according to the above. According to an aspect, the cam 52 has an arc shape.

According to an aspect, the cam 52 comprises an arc shaped cam surface 54.

According to an aspect, the third guide element 53 is a pin 53.

It should be readily appreciated that the ultimate dimensions and the materials of the device and its components are selected based on the overall space available in the vehicle compartment, e.g. in the dashboard. However, as an example, the components of the device can be made of a suitable a plastics, a metal such as stainless steel of a combination of plastics and metal. E.g. some parts of the device can be made of metal and other parts of the device may be made by plastics.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

The invention claimed is:

1. Air nozzle device for a vehicle comprising a housing defining an interior volume and having an air inlet at one side, an air discharge opening at a second side and an air flow channel through the housing for transporting a flow of air between the air inlet and the air discharge opening, the device further comprising
    an air flow regulator mechanism comprising a rod member comprising a rack, at least one flap member comprising a pinion, and an assembly guide mechanism arranged to be moveable between an assembly position and a non-assembly position,
    wherein
        the rack and pinion is arranged to, in an assembled state, interact to rotate the at least one flap member about an axis between an open and a closed position to regulate the flow of air in the air flow channel,
        the assembly guide mechanism is, in the assembly position, arranged to interact with the at least one flap member and the rod member to assemble the rack and pinion, and
        the assembly guide mechanism is, in the non-assembly position, arranged to obstruct the assembly of the rack and pinion.

2. The air nozzle device according to claim 1, wherein the assembly guide mechanism comprise a first guide element connected to the rod member and a second and a third guide element connected to the at least one flap member.

3. The air nozzle devicee according to claim 2, wherein the first guide element extends past the rack towards the at least one flap member.

4. The air nozzle device according to claim 2, radial direction of the axis and the third guide element extends past the pinion in the radial direction of the axis.

5. The air nozzle device according to claim 2, wherein the second guide element is positioned at a circumferential distance from the third guide element.

6. The air nozzle device according to claim 2, wherein a groove is arranged between said second and third guide elements to accommodate at least a part of the first guide element in the assembly position.

7. The air nozzle device according to claim 2, wherein, in the assembly position, the second guide element is arranged to be directed at an angle in view of the rod member, such that the first guide element is moveable past the second guide element and into contact with the third guide element, that is directed towards the rod member, when the rod member is moved towards the at least one flap member.

8. The air nozzle device according to claim 2, wherein, in the non-assembly position, the second guide element is arranged to be directed at an angle in view of the rod member that is smaller than an angle in the assembly position, such that the first guide element makes contact with the second guide element when the rod member is moved towards the at least one flap member.

9. The air nozzle device according to claim 2 wherein the first and second guide element are arranged to, in the non-assembly position, interact to obstruct the movement of the rod member (30) in relation to the at least one flap member.

10. The air nozzle device according to claim 2 wherein the first and second guide elements are arranged to, in the non-assembly the assembly position, interact to align the rack of the rod member and the pinion of the at least one flap member, when the rod member is moved towards the at least one flap member to assemble the rack and pinion.

11. The air nozzle device according to claim 2 wherein the rod member is moveable back and forwards towards the flap member and the rack is directed towards the pinion of the at least one flap member and arranged to, in the assembled state, interact with the pinion, and the first guide element is connected to the rod member in parallel to the rack and extends towards the at least one flap member.

12. The air nozzle device according to claim 2 wherein the pinion is arranged to rotate about the axis of the at least one flap member and arranged to, in the assembled state, interact with the rack, and the first and second guide elements are connected to the at least one flap member in parallel to the pinion and extends in the radial direction of the axis.

13. The air nozzle device according to claim 1, wherein the air flow regulator mechanism comprises at least a further flap member and the rod member comprises at least a further rack and a first guide element.

14. A vehicle compartment member being one of a dashboard, door trim, or a console, wherein the vehicle compartment member comprises an air nozzle device according to claim 1.

15. A vehicle comprising a vehicle compartment member according to claim 14.

* * * * *